(12) United States Patent
Cillessen et al.

(10) Patent No.: US 6,997,848 B1
(45) Date of Patent: Feb. 14, 2006

(54) VARIABLE RATIO TRANSMISSION WITH LOW GEAR

(75) Inventors: James A. Cillessen, 11766 W. 53rd Pl., Arvada, CO (US) 80002; DeLon L. Uncapher, Parker, CO (US)

(73) Assignee: James A. Cillessen, Arvada, CO (US)

( * ) Notice: Subject to any disclaimer, the term of this patent is extended or adjusted under 35 U.S.C. 154(b) by 209 days.

(21) Appl. No.: 10/373,945

(22) Filed: Feb. 25, 2003

Related U.S. Application Data

(63) Continuation-in-part of application No. 09/749,350, filed on Dec. 27, 2000, now Pat. No. 6,524,214.

(51) Int. Cl.
*F16H 15/18* (2006.01)

(52) U.S. Cl. .......................................... 476/55; 476/48
(58) Field of Classification Search ................. 476/47, 476/48, 55
See application file for complete search history.

(56) References Cited

U.S. PATENT DOCUMENTS

| | | | |
|---|---|---|---|
| 861,069 A * | 7/1907 | Wood | 476/18 |
| 1,302,821 A * | 5/1919 | McNeel | 476/1 |
| 1,381,866 A * | 6/1921 | Gherassimoff | 476/18 |
| 1,431,049 A * | 10/1922 | Schoonmaker | 476/19 |
| 2,148,759 A * | 2/1939 | Le Grand | 476/55 |
| 2,158,137 A * | 5/1939 | McConnell | 235/103.5 R |
| 2,610,513 A * | 9/1952 | Podell | 476/30 |
| 3,747,424 A | 7/1973 | Alexeev | |
| 4,161,890 A | 7/1979 | Goloff et al. | |
| 4,183,253 A | 1/1980 | Borello | |
| 4,192,201 A * | 3/1980 | McCoin | 475/215 |
| 4,459,868 A * | 7/1984 | Sargent | 476/4 |
| 5,525,119 A | 6/1996 | Marques | |

FOREIGN PATENT DOCUMENTS

| | | |
|---|---|---|
| DE | 314 836 C | 11/1996 |
| DE | 100 29 809 A1 * | 8/2002 |
| FR | 2 218 005 A | 6/1974 |
| GB | 144 380 A | 10/1920 |

* cited by examiner

*Primary Examiner*—William C. Joyce
(74) *Attorney, Agent, or Firm*—Rick Martin; Patent Law Offices of Rick Martin, P.C.

(57) ABSTRACT

A variable ratio transmission has a rotating drive cone with a gear at its narrowest diameter end to provide a non-slip high torque drive in low gear. A worm gear and drive shaft smoothly move an output drive disk back and forth along the drive cone to provide a smooth infinitely adjustable gear ratio to the output drive shaft. A slip clutch and forward, neutral, reverse transmission make the system suitable for motor vehicles especially trucks.

7 Claims, 8 Drawing Sheets

VARIABLE RATIO TRANSMISSION WITH LOW GEAR

RELATED APPLICATIONS

This is a continuation in part of U.S. application Ser. No. 09/749,350 filed Dec. 27, 2000 and issued as U.S. Pat. No. 6,524,214 on Feb. 25, 2003.

FIELD OF THE INVENTION

The present invention relates to a disk member and cone member in direct contact with one another with variable relative positioning providing a transmission with a geared lowest gear and an infinitely variable ratio of input to output speed for higher gears.

BACKGROUND OF THE INVENTION

Gear ratios of vehicles are generally fixed to limited numbers of gears. These gears try to establish an ideal relationship between the input force of the motor and the speed of motion of the vehicle. Thus, at lower speeds, higher torque is applied to the driving axle while maximum speed is low; and at higher speed less torque is required but maximum speed is high. Maximum engine torque is usually constant while driving torque requirements vary greatly with speed and road topology. Ideally, a continuous gear shifting would optimize driving conditions. Today's standard automobile transmissions generally provide 3 to 5 gear ratios and are manufactured with many parts. Road topology, frequent shifting of gears and many parts all tend to create high maintenance and non-optimal driving performance.

U.S. Pat. No. 3,747,424 describes a speed reducing gear having a frustoconical body acting as the reducing mechanism driving a horizontal output shaft. A horizontally engaged input drive shaft (worm gear) can be moved along the gradiated surface of the frustoconical body to reduce the speed ratio between the input and output. The invention requires a 90 degree angle between the input and output shafts making it awkward for a transmission shaft. It also requires a worm type interface for force transfer because the contact area of input to output would be very slight without a worm interface. It is also designed as a speed reducer.

U.S. Pat. No. 5,525,119 discloses a mechanism for varying rotational speed between two rotary shafts. It employs an intermediate roller contacting two cones. Speed variation is employed by the position of the roller between the two oppositely mounted cones while the roller is under pressure against the surfaces of both cones.

U.S. Pat. No. 4,161,890 discloses an improvement to the contact surfaces in preventing slippage between two substantially inelastic members that are in frictional engagement.

U.S. Pat. No. 4,183,253 discloses a moveable power transfer wheel interconnecting a pair of dual cones. Movement of the transfer wheel between both sets of cones varies input/output speed ratio.

What is needed is a mechanism employing direct drive means while able to vary the input/output speed ratio with no intermediate contacting parts. What is also needed is a mechanism to have the transfer of power directly between an input and an output member. What is further needed is a geared lowest gear for low speed torque.

The present invention resolves these problems. The present invention provides an ability to vary speed directly between two members while providing direct power transfer with no intermediate parts. The present invention also provides in-line drive. That is, the input shaft and output shaft can be maintained with their individual axis in a coplanar relationship. The present invention is also simple to manufacture with minimal parts. The present invention is also easily adjustable and maintainable. The present invention also provides a geared lower gear for positive slip free power transfer in low gear.

SUMMARY OF THE INVENTION

The main aspect of the present invention is to provide a continuously variable speed (within set limits) between a driving shaft and a transmitting output shaft.

Another aspect of the present invention is to provide a means for input and output drive contacting surfaces to be in parallel for optimal power transfer.

Another aspect of the present invention is to provide contact between both the driving member and the transmitting member in a co-linear fashion. That is, both members have outer surfaces that are maintained in parallel.

Another aspect of the present invention is to provide a means of adjustment of the speeds. An axially moveable shaft coupled to the disk shaped member in a reciprocating fashion accomplishes this. Movement of the disk shaped member surface to various parts of the cone surface changes the speed ratio.

Another aspect of the present invention is to provide a means for insuring constant pressure between the surface of the disk member and the cone member during operation. Constant pressure and high frictional coefficients prevent slippage during operation.

Another aspect of the present invention is to provide a high coefficient of friction between the disk member and cone member when in operation using a hydraulic actuator and hinged output drive assembly.

Another aspect of the present invention is to provide a means of having the input and output drives along the same plane for ease of assembly in using applications such as automobiles for example.

Another aspect of the present invention is ease of manufacture via fewer parts than a standard transmission.

Another aspect of the present invention is improved reliability and life via fewer parts and fewer wear surfaces than a standard transmission.

Another aspect of the present invention is ease of maintainability.

Another aspect of the present invention is to integrate a forward/neutral/reverse gear box and slip clutch with the input cone.

Another aspect of the present invention is to provide a geared lowermost gear between the input cone and the output disk.

Variable speed is accomplished by moving a disk shaped member along a conical shaped member. In this description of the present invention the cone will be referenced as the input driving-member and the disk as the output-driving member. The input driving member, or cone, is connected to a shaft that is driven by a motor input such as an automobile engine. Both members are directly connected to input and output-drive shafts respectively and rotate along the axis of each shaft. Both members are in direct pressure contact with each other with no intermediate parts; thus, power is transferred directly between the disk and cone members. The outer edge surface of the disk is parallel with the outer edge surface of the cone. A 1:1 speed ratio, for example, can be maintained when the output disk member circumference is at the large end of the input cone member with matching circumference. With the output drive shaft connected to the disk member and the input shaft connected to the cone member, the ratio would be 1:1. If the disk were moved to the smaller circumference ($1/10^{th}$ circumference of disk for example) end of the drive cone the ratio would be 10:1. More torque would be transmitted at the lower ratio. Selection of ratios would be a design requirement dependent and changeable via maximum and minimum circumferences of the cone. The preferred embodiment also uses a geared interface in low gear between the input cone and the output disk.

Movement of a positioner shaft connected to the disk member accomplishes variable output speed changes. This movement adjusts the surface contact point between the disk member and the cone member. This provides a different surface contact point between the disk shaped member and the cone shaped member. The different surface contact point of the disk outer surface onto the cone outer surface is related to a different outside circumference of the cone member and, thus, a different drive ratio. The outside edge surface of the disk member is parallel to the outside longitudinal edge surface of the cone member. Movement and retention of position could be accomplished, for example, by an electrically driven screw shaft or by a hydraulic system to provide infinitesimal adjustment while also providing direct lateral holding power.

Constant pressure between the disk member and the cone member contact points can be maintained with various design methods. Shown herein is a method using a system with a pivot point hinge supporting a moveable output shaft assembly that places a downward pressure on the output shaft by means of a hydraulic actuator(s). Pressure over the range of movement of the contact surface points between the disk and cone members is constant and can be easily adjusted based on design requirements using the hydraulic actuator(s).

A high coefficient of friction can be maintained between the outer surface of the cone member and the outer surface of the disk member with modern materials that provide a high frictional coefficient while exhibiting relatively little wear. The working cone member is presently flame sprayed with stainless steel onto the steel base. Other materials such as specially developed ceramics, kevlar, carbide impregnated materials etc. also may be desirable depending on the application. Preferably the cone is foam filled to reduce noise. Disk member outside edge thickness design variation also provides a design means of increasing or decreasing contact surfaces between the disk and cone member surfaces.

While the output and positioner adjustment shafts are parallel, all shafts (input, output and positioner) are all co-planar. This is accomplished by a housing design with bearings, clamps and framework holding all shafts within the same co-plane. This lends itself to ease of assembly and application.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

The preferred embodiment of the variable ratio transmission 1 is made up of two basic assemblies. The lower stationary section is the Input Cone Drive Assembly 2. The hinged upper section is the Output Drive Shaft Assembly 3.

Figure 1:
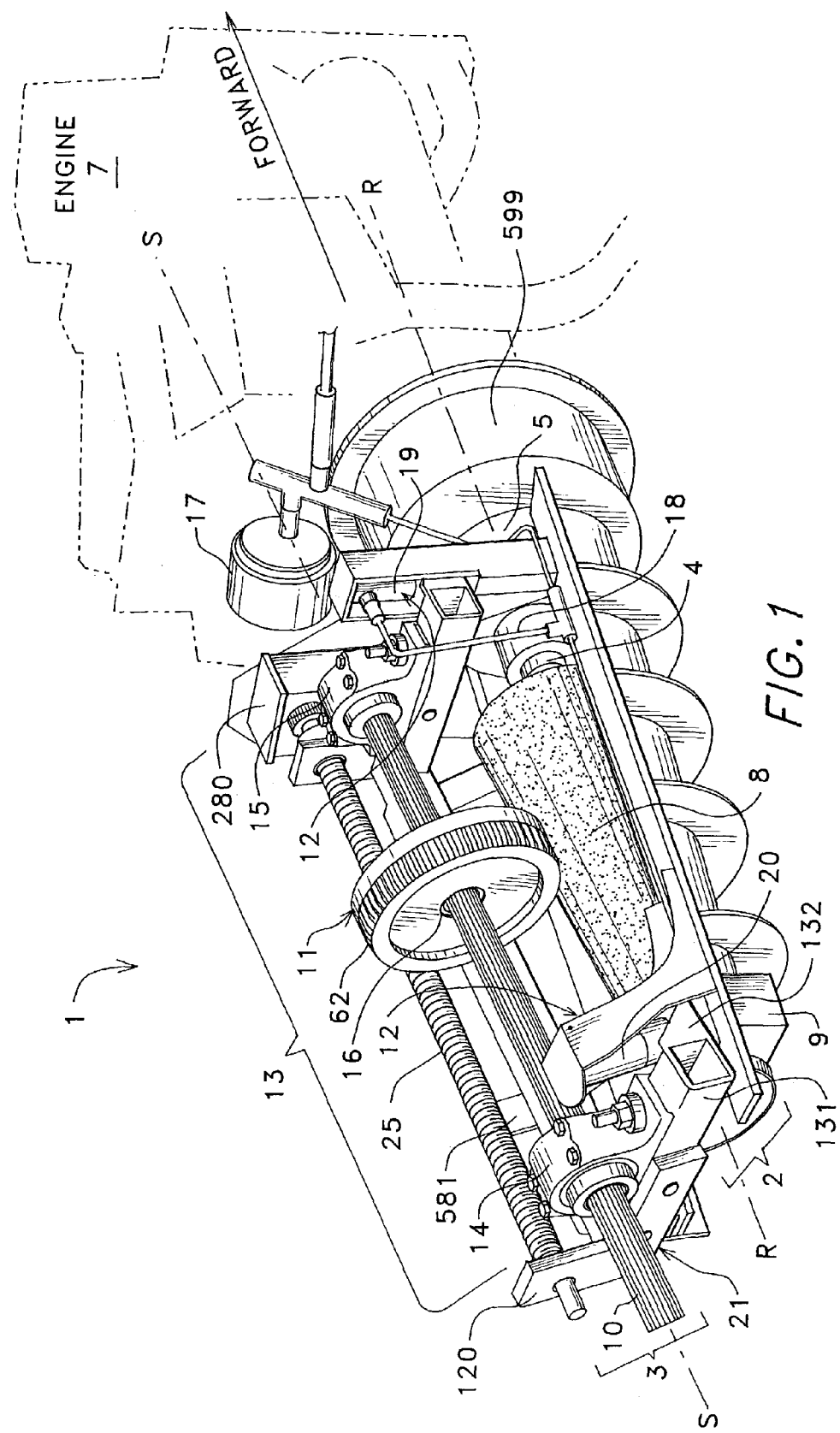
FIG. 1 is a rear perspective view of the preferred embodiment variable ratio transmission 1 taken from the right (passenger) side relative to the arrow labeled FORWARD.

The Input Cone Drive Assembly (driving member) 2 as seen in FIG. 1 consists of an Input Drive Shaft (driving shaft) 4 that is driven directly from an engine 7 drive shaft 4 that is powered by a Forward/Neutral/Reverse transmission 5 and slip clutch 599 (an electric torque converter is preferred). Input drive shaft 4 rotates about longitudinal drive axis R—R as seen in FIG. 1. The power input could be, for example, an automobile engine 7 as shown. A conical drive member (driving cone) 8 is rigidly connected to input drive shaft 4. Input drive shaft 4 is physically connected to base mount (frame) 9.

The output drive shaft assembly (driven member) 3 is seen in FIG. 1. The main components of output drive shaft assembly 3 are the output drive shaft (transmission shaft) 10, the output drive disk 11, the adjustable pressure assembly (adjustable compression force assembly) 12 and the ratio positioner assembly 13. The output drive shaft 10 is connected to the output drive shaft assembly 3 at bearing mounts 14, 15. Output drive shaft 10 rotates about longitudinal axis (transmission axis) S—S. Output drive disk 11 is internally grooved at its center 16 and mounted to output drive shaft 10 which is a spline shaft. Contact between output drive disk 11 and conical drive member 8 create the output drive force. Adjustable pressure assembly 13 maintains downward pressure (compression) between output drive disk 11 and conical drive member 8.

A pressure accumulator 17 is selected to have a constant hydraulic pressure output to lines 18 in order to keep a chosen pressure on the hydraulic cylinders 19, 20. The hydraulic cylinders 19, 20 force the output drive shaft assembly 3 which is hinged at 21 down against the stationary input cone drive assembly 2.

Figure 2:
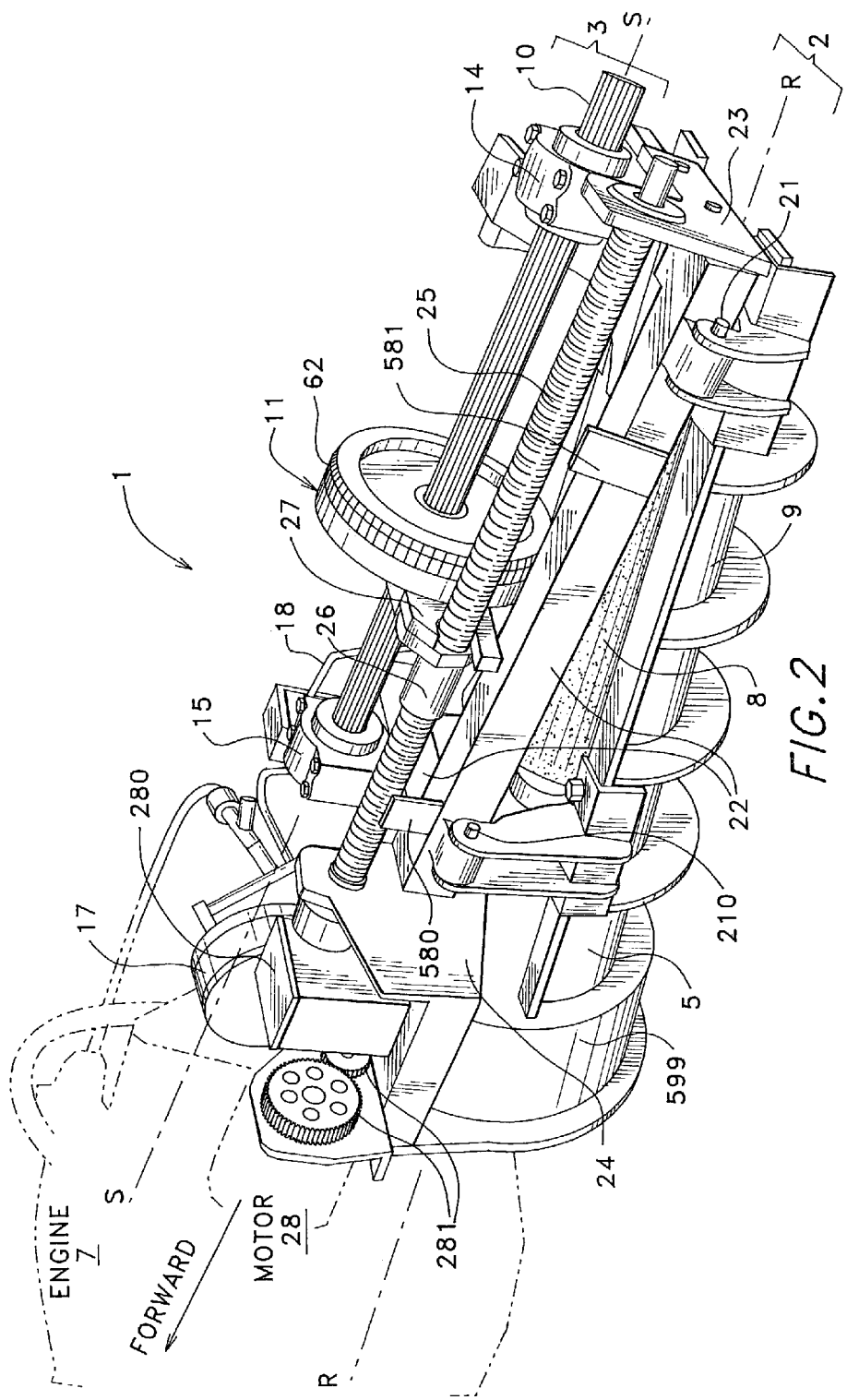
FIG. 2 is a rear left side view of the variable ratio transmission shown in FIG. 1.

Referring next to FIG. 2 the output drive shaft assembly 3 has a frame 22 which is hingedly attached to the stationary input cone drive assembly 2 at hinges 21, 210. An end plate 23 is affixed to the frame 22 to secure the output drive shaft 10 and the worm drive shaft 25. The worm drive shaft 25 is supported at the forward end by an end plate housing 24. The end plate housing 24 also supports a motor 28 (preferably electric or could be hydraulic) which turns the gear box 280 which turns the worm drive shaft 25 under control by the operator of the system 1 as the operator changes the gearing ratio from high to low range. Reduction years 281 are shown. As the worm drive shaft 25 rotates either clockwise or counterclockwise under the operator's control, the collar 26 moves forward and backward. The output drive disk 11 is connected to the collar 26 via the output disk coupler 27. Electric limit switches 580, 581 present an overshoot of the output drive disk 11.

Figure 3:
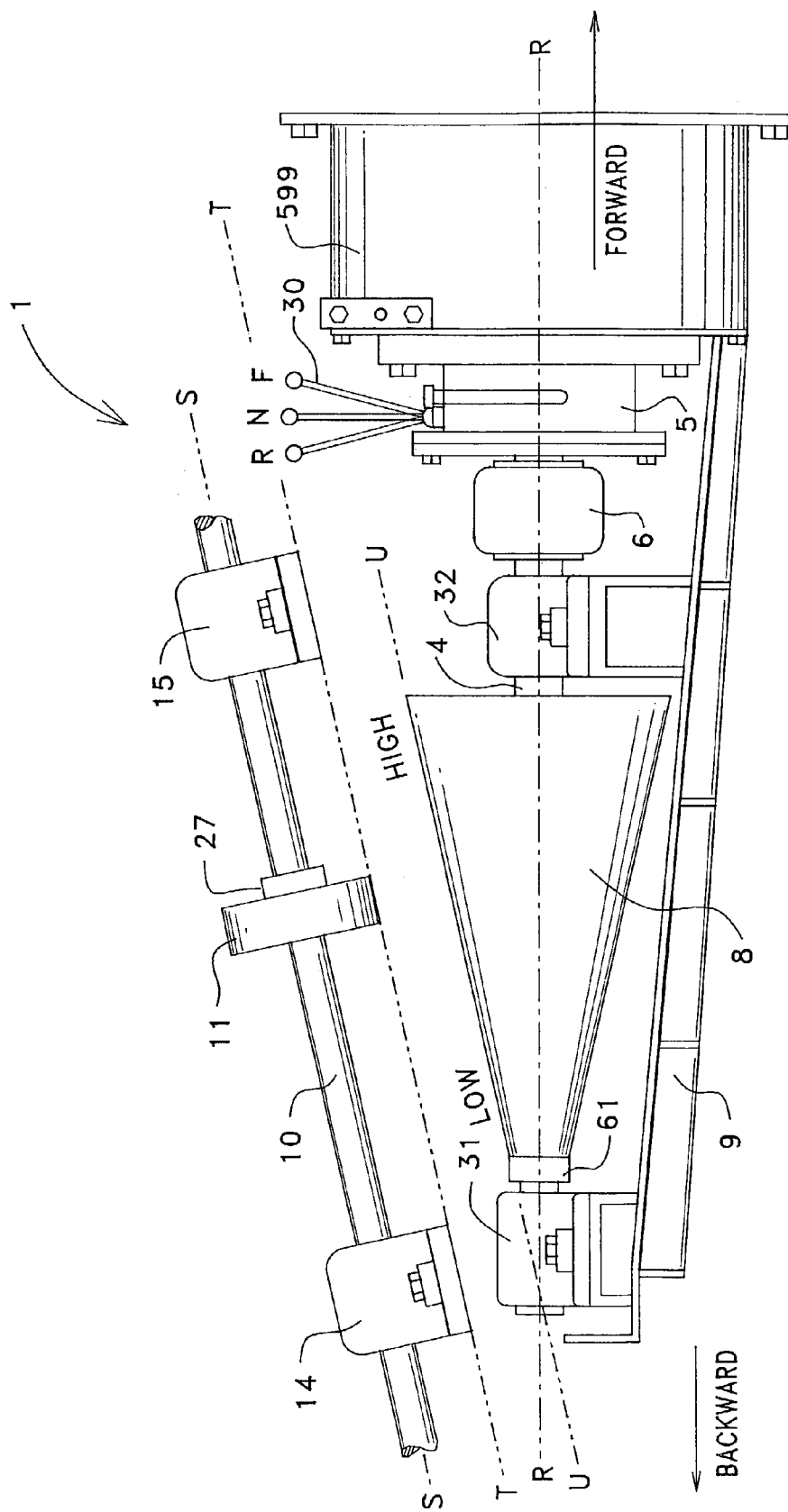
FIG. 3 is a right side plan view of the variable ratio transmission shown in FIG. 1.

Referring next to FIG. 3 the output drive disk 11 moves along a plane T—T which remains parallel to the rotating periphery plane U—U of the conical drive member 8. The input drive shaft 4 is mounted to the frame 9 via bearing mounts 31, 32.

In operation the operator can vary the engine speed to slow, wherein the slip clutch 599 disengages to stop power to the conical drive member 8 and shift to Forward/Neutral/Reverse with shifter 30. The operator can move the output drive disk 11 forward and backward via the output disk coupler 27 as noted in FIG. 2. By moving the output drive disk 11 backward, the system 1 is in LOW range. By moving the output drive disk 11 forward, the system 1 is on HIGH range.

Figure 4:
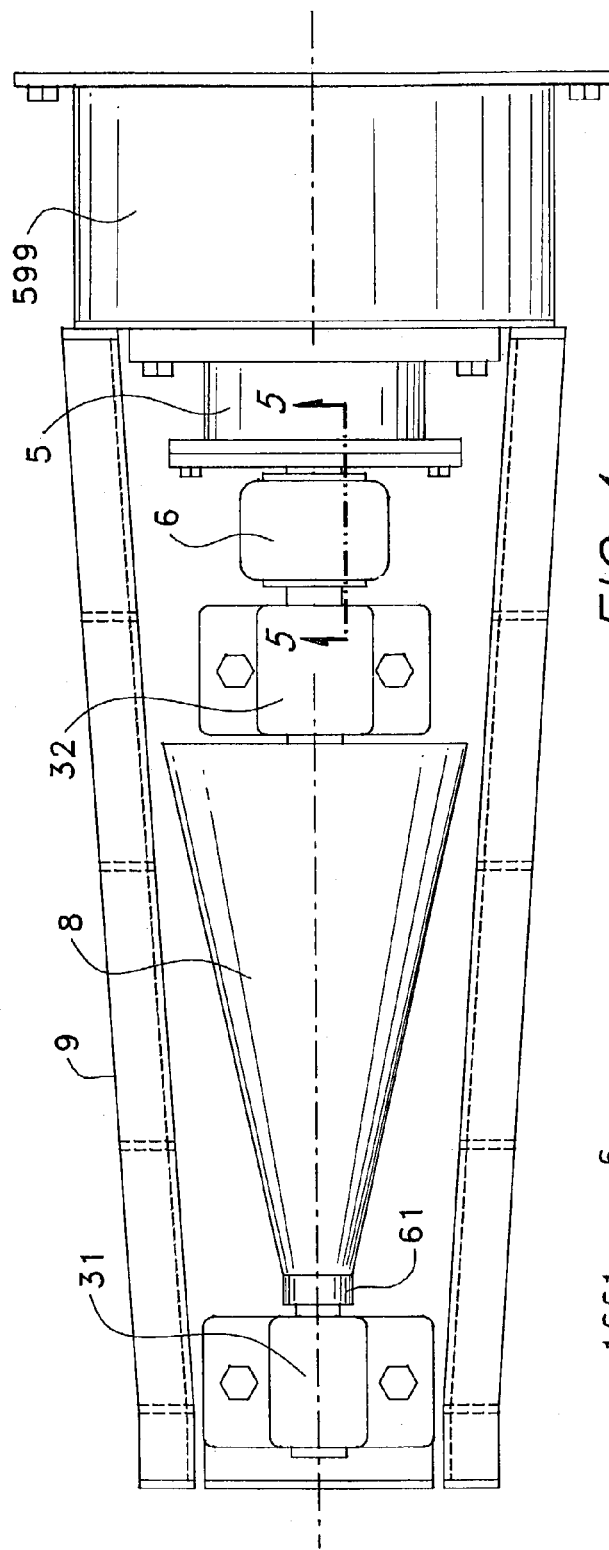
FIG. 4 is a top plan view of the variable ratio transmission shown in FIG. 1.
Figure 5:
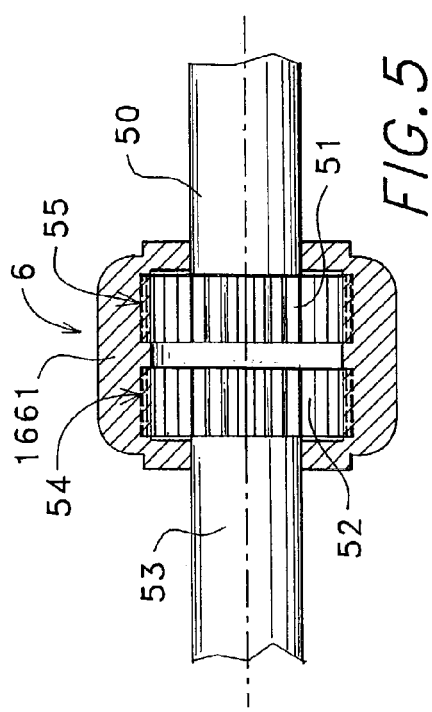
FIG. 5 is a longitudinal sectional view of the alignment joint taken along line 5—5 of FIG. 4.

Referring next to FIGS. 4, 5 the transmission output drive shaft is labeled 50. It has a gear 51. The alignment joint 6 is prior art, and it compensates for alignment errors between the transmission 5 and the conical drive member 8 and its drive shaft 53 with gear 52. The outer edge 54 of gear 52 engages a collar 61. The outer edge 55 of gear 51 also engages the collar 61, and the meshing teeth provide for a certain misalignment.

The prior art slip clutch 599 disengages the power to the transmission 5 at low rpm.

Figure 6:
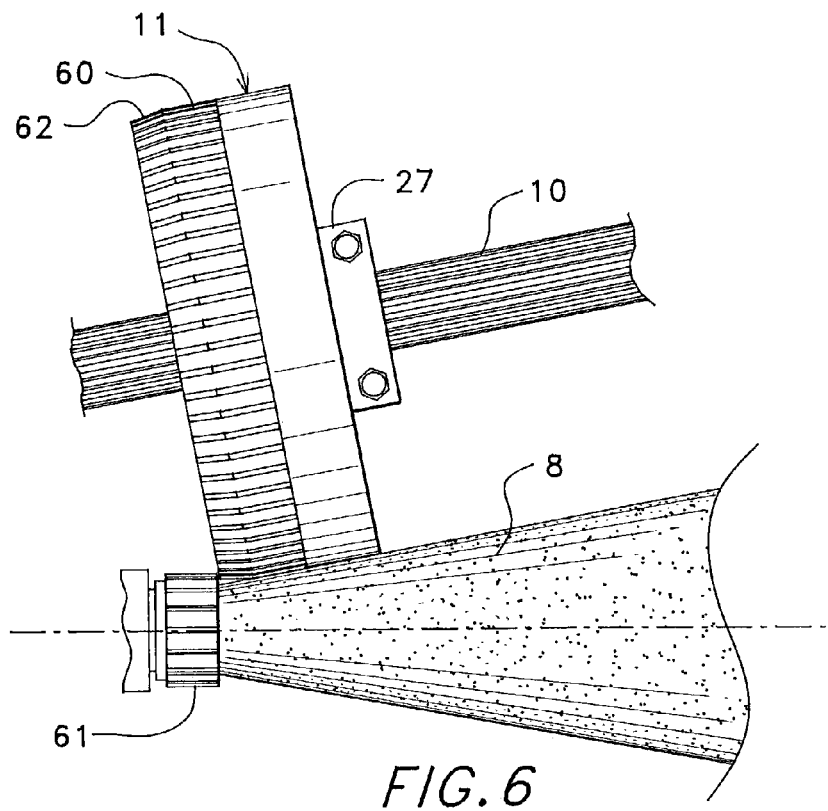
FIG. 6 is a close up side plan view of the input cone gear beginning to engage the output disk gear in low gear.
Figure 7:
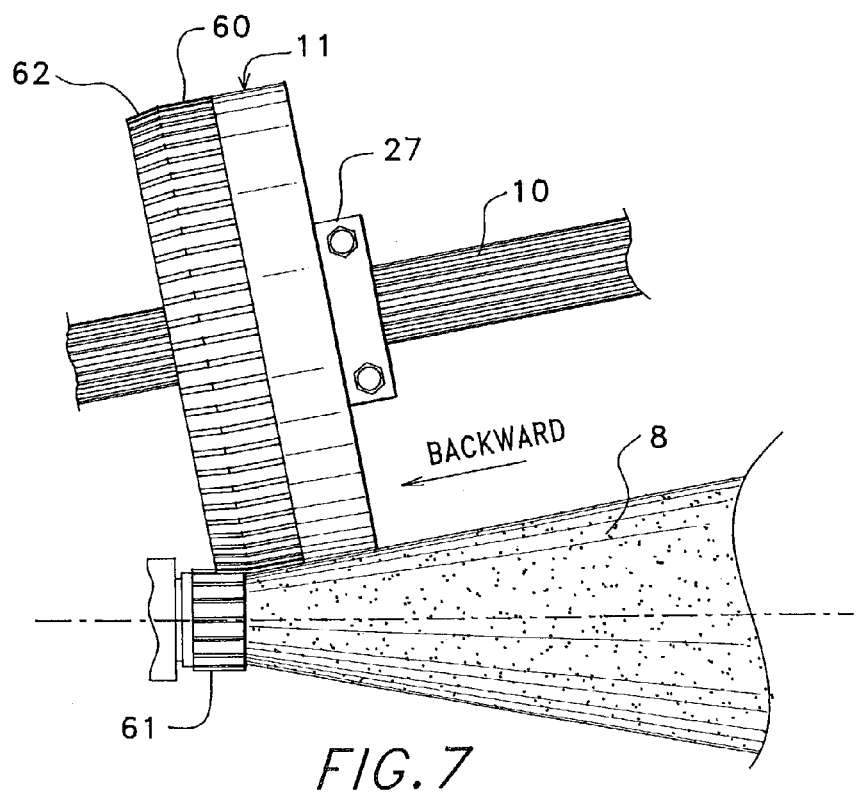
FIG. 7 is the same view as FIG. 6 with the output disk gear almost fully engaged with the input cone gear.
Figure 8:
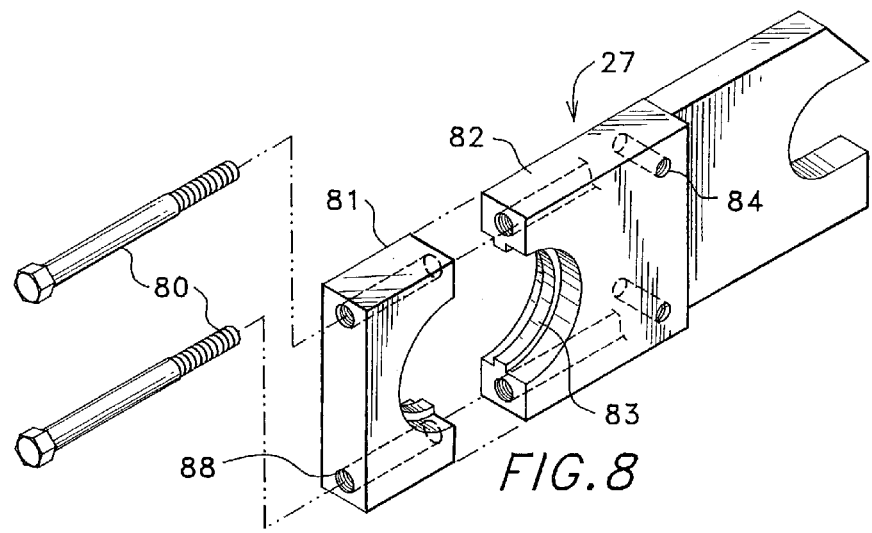
FIG. 8 is an exploded view of the output disk coupler which connects to the worm drive shaft and the output disk.
Figure 9:
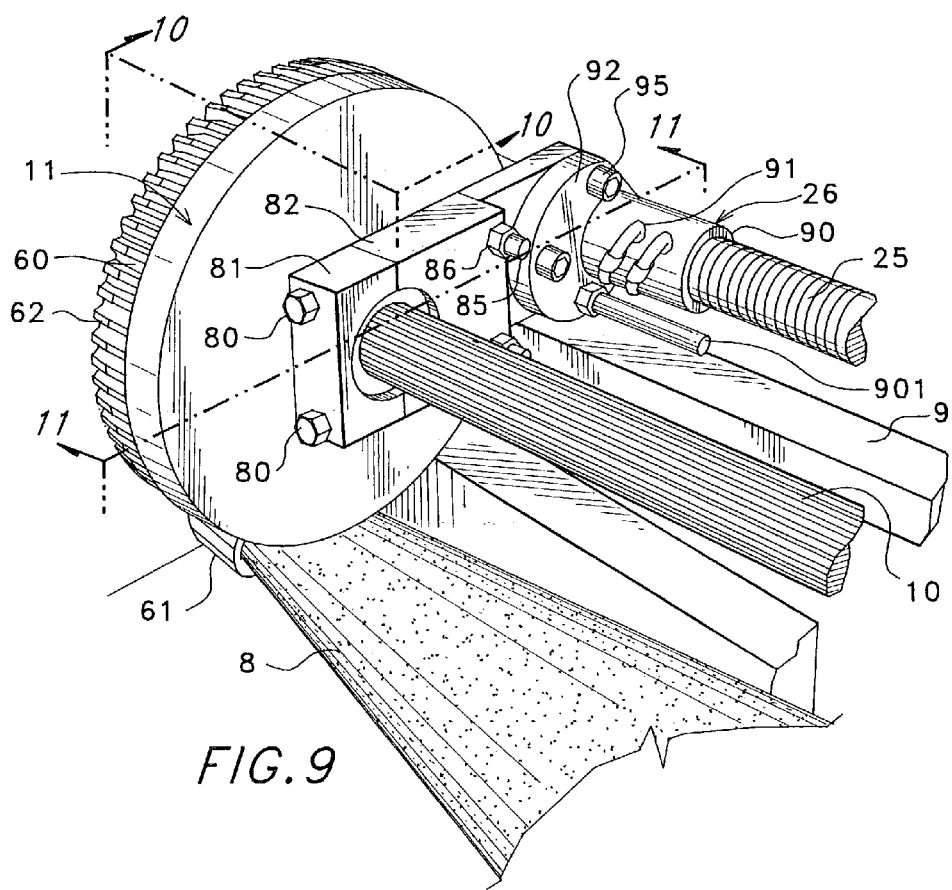
FIG. 9 is a top perspective view of the output disk moved by the worm drive shaft.
Figure 10:
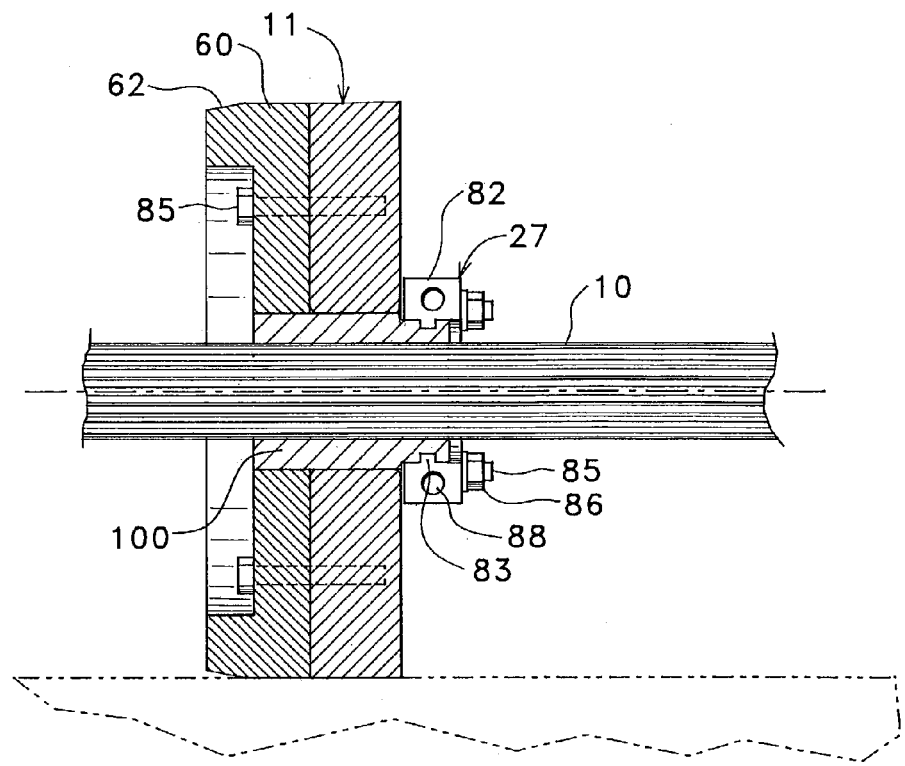
FIG. 10 is a longitudinal sectional view of the output disk and disk coupler taken along line 10—10 of FIG. 9.
Figure 11:
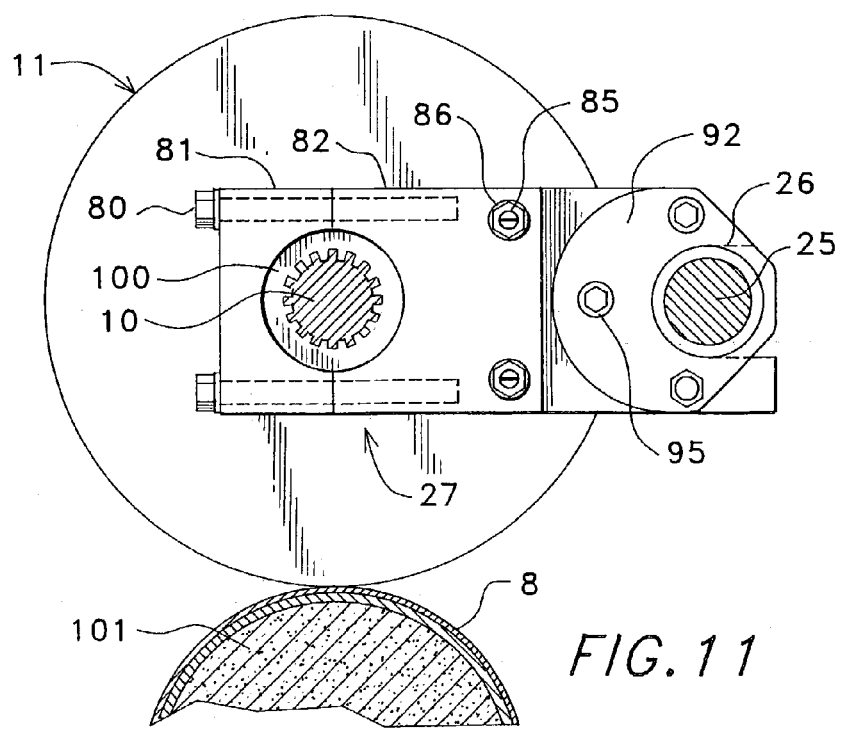
FIG. 11 is a cross sectional view of the output shaft, disk coupler and worm drive shaft taken along line 11—11 of FIG. 9.

Referring next to FIGS. 6,7 the low gear aspect of the present invention is shown. The output drive disk 11 has a peripheral gear 60 at its rearward section. The peripheral gear 60 is tapered at its rearward section as shown by arrow 62 so as to smoothly mesh with the cone's gear 1661 when the output drive disk 11 is moved backward as shown by the arrow in FIG. 7. FIG. 7 displays low gear which is a non-slip, high torque transmission of power from the cone gear 61 to the output shaft 10. This gear 60/61 interface is provided to start a tractor trailer from a dead stop or to propel it uphill.

Referring next to FIGS. 8–11 the output disk coupler 27 comprises a left member 82 onto which the base 92 of the collar 26 is bolted with nuts and bolts 95. The right member 81 of the output disk coupler 27 is bolted to the left member 82 through holes 88 with bolts 80. A ridge 83 is thereby secured into the output drive disk 11 flange 100. In this manner the collar 26 is fastened to the output drive disk 11 to move it back and forth. A mechanical stop 901 prevents an overshoot of the output drive disk 11.

The collar 26 has a ball bearing coupler 90, wherein ball bearings flow though tubes 91 to provide a smooth and precise movement of the collar 26 without backlash. Holes 84 receive bolts 85 which are fastened with nuts 86 to secure left member 82 to the output drive disk 11. The output drive shaft 10 spins freely inside the output disk coupler 27. The drive cone 8 is preferably filled with foam 101 for noise abatement.

Figure 12:
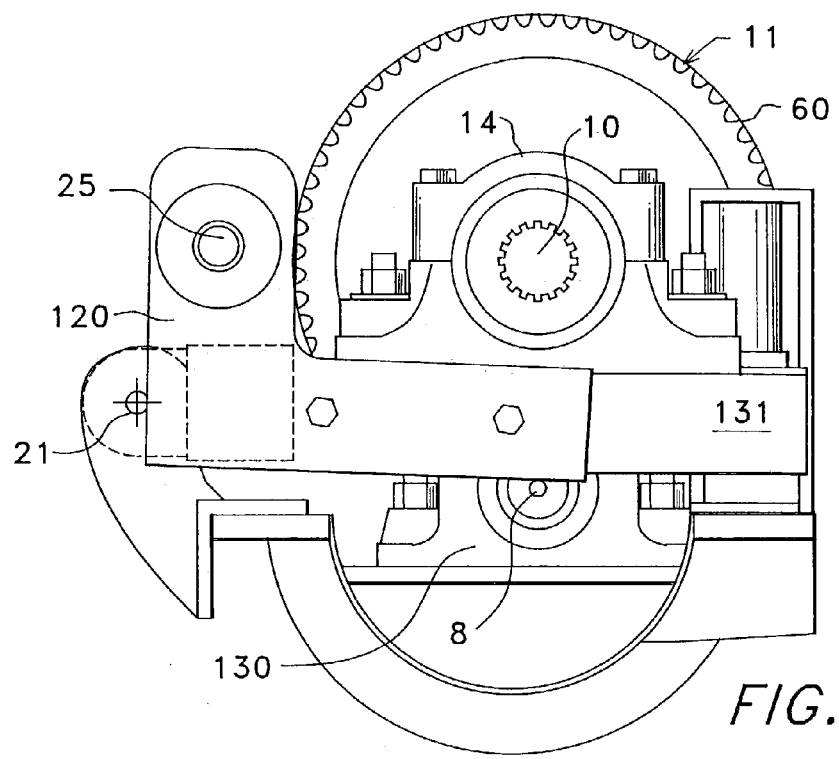
FIG. 12 is a rear plan view of the variable ratio transmission showing the output shaft assembly fully engaged against the stationary input cone assembly.
Figure 13:
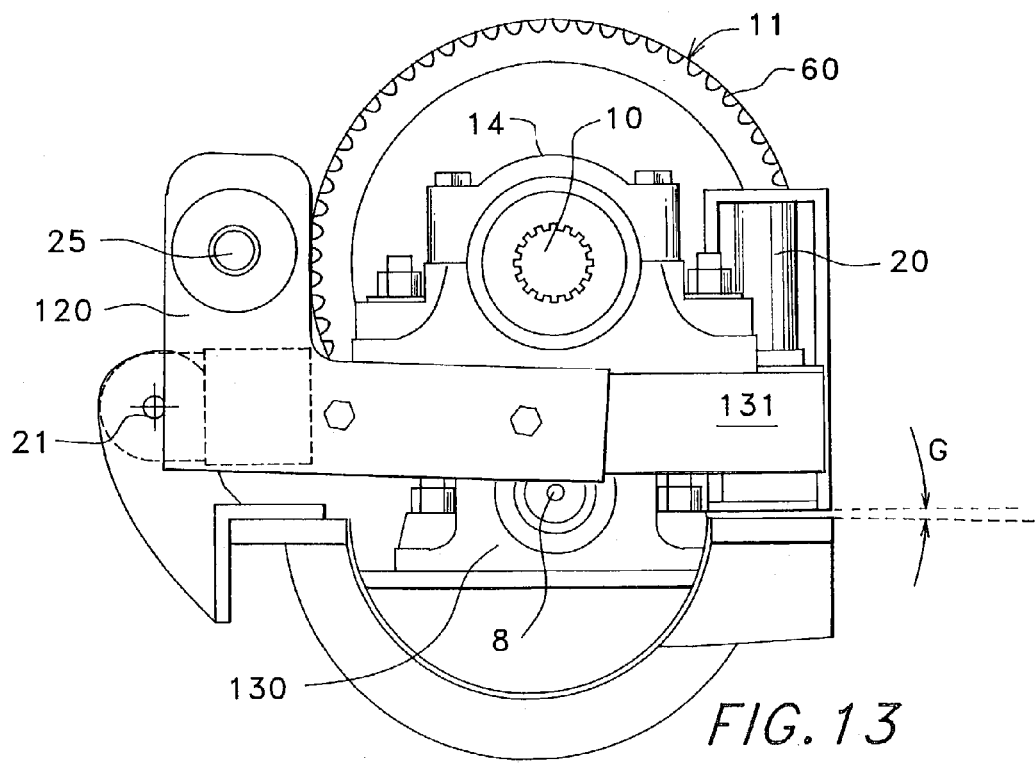
FIG. 13 is the same view as FIG. 12 with the output shaft assembly partially disengaged from the stationary input cone assembly.

Referring next to FIGS. 12, 13 bearing mount 130 secures the rear end of the driving cone 8. Bracket 120 secures the end of the worm drive shaft 25. The hinge 21 allows the output drive shaft assembly 3 to be tension adjusted against the stationary input cone drive assembly 2 by means of hydraulic cylinders 19, 20. The gap G between assemblies 2 and 3 is adjusted occasionally due to wear on the driving cone 8 and the output drive disk 11. The tubular frame member 131 supports the bearing mount 14 and the adjustment plate 132. The hydraulic cylinder 20 pushes down on adjustment plate 132 to adjust the tension between assemblies 2 and 3.

We claim:

1. A transmission for providing a continuously variable relation between a driving member and a driven member, said transmission system comprising:
    a driving cone shaped member connected to a powered shaft;
    an output drive disk and drive shaft assembly frictionally engaged with the driving cone shaped member;
    said output drive disk and drive shaft assembly having a linear transporter to engage an output drive disk with a narrow diameter, low gear, portion of the driving cone shaped member to a wide diameter, high gear, portion of the driving cone shaped member;
    said driving cone shaped member having a gear at its narrow end which meshes with a gear on an output drive disk, thereby providing a non-slip engagement between the output drive disk and the driving cone shaped member in a lowest gear ratio position; and
    wherein the output drive disk and drive shaft assembly further comprises a hinged frame connected to a base frame of the driving cone shaped member; and
    wherein a powered actuator maintains a desired pressure of the output drive disk against the driving cone shaped member by simultaneously forcing a portion of the output drive shaft on opposite sides of the output drive disk toward the driving cone.

2. The transmission of claim 1, wherein the linear transporter further comprises the output drive disk, the drive shaft assembly with a motor powered worm gear shaft and a collar having precision meshing gears linearly engaged with the worm gear shaft, and said collar having a connection to the output drive disk.

3. The transmission of claim 2, wherein the driving cone shaped member further comprises a rough outer surface and a sound insulating inner core.

4. The transmission of claim 1, wherein the linear transporter further comprises a limit switch, thereby preventing an overshoot of the output drive disk along the driving cone shaped member.

5. A continuously variable ratio transmission for use between a drive shaft and an output drive shaft, said transmission comprising:
    a driving cone connected to the drive shaft;
    an output drive disk means frictionally engaged with the driving cone functioning to rotate in a ratio to a rotation of the driving cone based on a linear position along a longitudinal axis of the driving cone;

said output drive disk means having the output drive shaft connected through its center of rotation;

a linear transport means functioning to move the output drive disk means back and forth along a peripheral surface of the driving cone;

a gear means on the driving cone functioning to provide a direct, non-slip engagement between the driving cone and the output drive disk means in low gear operation; and wherein the output device disk means further comprises a gear means functioning to mesh with the gear means on the driving cone; and wherein the linear transport means further comprises a pivot mount means functioning to provide an adjustable force between the driving cone and the output drive disk means via a force on each side of the output drive disk.

6. The transmission of claim 5, wherein the linear transporter means further comprises the output drive disk means, a drive shaft assembly means with a motor powered worm gear shaft and a collar means having precision meshing gears linearly engaged with the worm gear shaft, and said collar means having a connection to the output drive disk means, all functioning to provide a minimal backlash precision movement of the output drive disk means.

7. The transmission system of claim 6, wherein the driving cone further comprises a rough outer surface and a sound insulating inner core.

* * * * *